Jan. 1, 1957  H. M. RICHARDSON ET AL  2,775,911
METHOD OF EMBOSSING A METAL ROLL
Filed Nov. 14, 1951
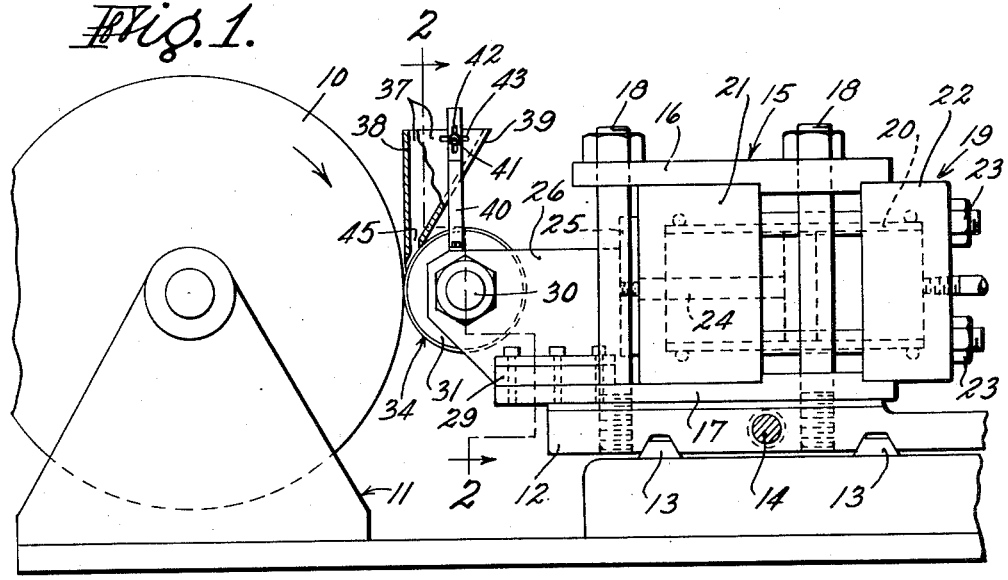
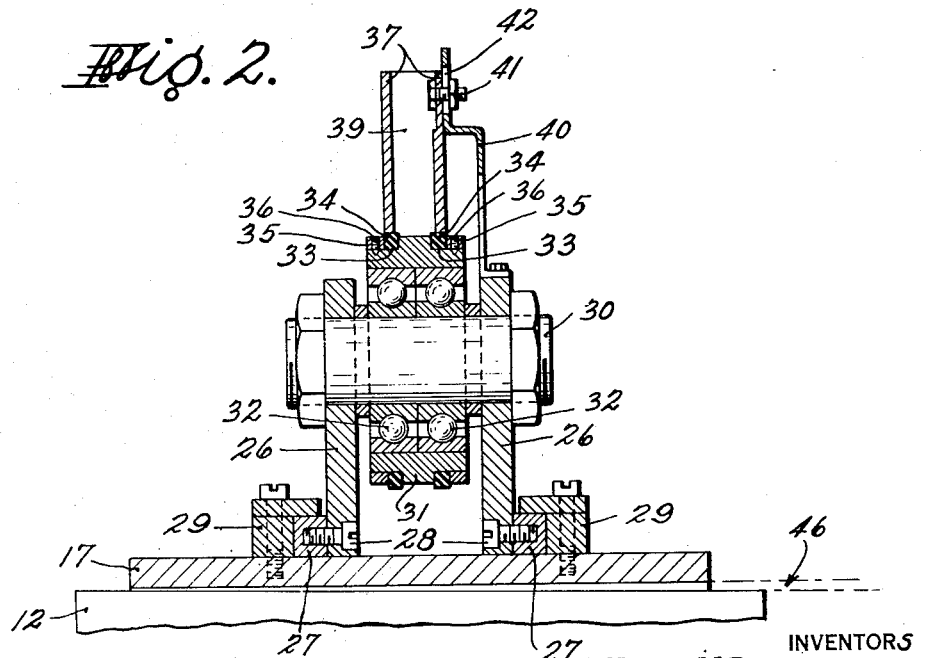
INVENTORS
HENRY M. RICHARDSON AND
WESLEY S. LARSON
BY Chapin & Neal
ATTORNEYS

United States Patent Office 2,775,911
Patented Jan. 1, 1957

2,775,911

METHOD OF EMBOSSING A METAL ROLL

Henry M. Richardson, Springfield, Mass., and Wesley S. Larson, Hazardville, Conn., assignors to The Grote Manufacturing Co., Inc., Bellevue, Ky., a corporation of Kentucky Application November 14, 1951, Serial No. 256,351

6 Claims. (Cl. 76—107)

This invention relates to ways and means for preparing a metal embossing roll for use in forming reflex reflecting sheets and webs.

Reflex reflecting sheets or plates have heretofore been made by molding or embossing a plurality of segmental lens formations on the surface of a sheet or plate of transparent plastic material and backing the sheet or plate with a light reflecting sheet of metal foil or similar material. For satisfactory results it is necessary that the surface of each lens shall have optical smoothness which requires that the surface of the mold or embossing cavities by which the lenses are formed shall be highly polished. This requirement has limited the lenses to a relatively large size requiring a relatively thick plate or sheet. The advantages of a thin flexible reflex reflecting sheet provided in continuous web or strip form has been recognized and a lens system employing extremely small lenses giving adequate coverage has been proposed. Attempts, however, to prepare an embossing roll with the extremely small lens forming cavities needed, employing conventional methods of hobbing, etching, cutting or casting have proved unsuccessful. This failure has been mainly due to the fact that no practical means are available to secure an adequate surface polish of the small lens cavities.

It is an object of the present invention to provide an embossing roll suitable for embossing extremely small lens formations on a thin flexible strip or web of plastic material in the production of reflex reflecting materials, and to provide ways and means of preparing such an embossing roll in which the surfaces of the lens forming cavities are capable of producing lens surfaces of optically acceptable smoothness.

It has been found that clean fire polished glass beads may be pressed into the surface of a metal roll of sufficient hardness for plastic embossing purposes, and further that, if the surface of the metal roll is polished prior to receiving the impressions of the beads, the cavities formed in the roll by the beads provide polished lens forming cavities, the surfaces of which will impart an optically acceptable smoothness to the surfaces of the lenses formed by the cavities on a plastic strip or web embossed by the roll.

It is a further object of the present invention to provide means by which glass beads may be pressed into the surface of the metal roll in a manner to provide a multiplicity of lens formations to prepare the roll for satisfactorily embossing a strip or web of plastic material for reflex reflecting purposes.

Other and further objects, residing in the details of the method and means by which the embossing roll is prepared will be made apparent in the following specification and claims and in the accompanying drawings.

In the accompanying drawings:

Fig. 1 is an elevational view of apparatus embodying the invention; and

Fig. 2 is a partial sectional view taken substantially on line 2—2 of Fig. 1.

According to the present invention, and referring to Figs. 1 and 2, a stainless steel roll 10, of suitable hardness and having its surface polished, is axially mounted on the live and dead centers of a suitable lathe, generally indicated at 11, or equivalent means, by which the roll is rotated in the direction of the arrow in Fig. 1. A carriage 12 is mounted on ways 13 for travel parallel to the axis of roll 10. The carriage is driven on the ways 13 by any suitable means as by a worm screw indicated at 14.

Mounted on the carriage is a frame generally indicated at 15 and comprising upper and lower clamp plates 16 and 17 respectively and bolts 18. A suitable hydraulic cylinder generally indicated at 19 is clamped between plates 16 and 17. As shown the hydraulic cylinder comprises a cylindrical body 20, the ends of which are telescoped in head blocks 21 and 22, the assembly being held together by bolts 23. The piston rod 24 of the hydraulic cylinder is connected to a cross plate 25 which carries a pair of spaced brackets 26, Fig. 2, each provided at its lower edge with a guide bar 27 held thereto by screws 28. The bars 27 slide in ways 29 secured to plate 17. The free forward ends of brackets 26 carry a shaft 30 upon which is rotatably mounted a roller 31 by means of ball bearings 32. The edges of the roller 31 are recessed as at 33 to receive rubber rings 34, the outer surfaces of which extend slightly above the surface of the roll 31. Rings 34 are held in place by collars 35 secured by screws 36.

A funnel comprising side walls 37 and front and rear walls 38 and 39 respectively, is adjustably supported on a standard 40 fixed on one of the brackets 26. As shown the funnel is held to the standard by a bolt 41 extending through a vertical slot 42 in the standard and a horizontal slot 43 in the adjacent wall of the funnel, thus permitting vertical and horizontal adjustment of the funnel relative to the roller.

The rear wall 39 of the funnel is inclined forwardly and downwardly to provide a narrow discharge slot 45 at the bite of roll 10 and roller 31. The edges of the side walls 37 at the sides of the slot 45 ride on the rubber rings 34, and the latter, engaging the face of roll 10, confine the passage between the roll and roller to the width of the surface of roller 31 lying between the rings.

Roller 31 rotates freely in its bearings. With roll 10 being driven in the direction of the arrow and roller 31 being pressed diametrically against the surface of roll 10 by the hydraulic cylinder, small fire polished glass beads, or other beads having similar characteristics as to surface polish and of adequate hardness, are fed to the funnel and pass in a constant layer or ribbon of one bead thickness between the roll and roller under the pressure of the hydraulic cylinder which forces the beads into the surface of roll 10. As the roll 10 rotates, the carriage 12 with the roller and funnel is constantly moved longitudinally of the roll 10 so that the flowing beads emboss a helical band over the surface of the roll, the edges of the helical band being contiguous or slightly overlapping so that the entire surface of the roll is embossed as the carriage travels from one end of the roll to the other.

While the width of the effective surfaces of roller 31 may be varied within reasonable limits, a width between the rings 34 of ⅝" has proved satisfactory, the roller 31 being given a suitable lead angle as indicated at 46. A width of ⅝" between the rings 34 will accommodate approximately 100 beads of suitable diameter. The diameter of the beads varies slightly and the lens forming depressions formed in the surface of roll 10 are in a random arrangement and of slightly varying diameter and depth.

The pressure applied to roller 31 is just under that which would crush the beads. In practice some beads may be broken and these are screened out before repassing the beads through the funnel.

In the manner above described an embossing roll may be formed with extremely small, highly polished lens forming depressions. Rolls providing lens formations of an average range of .0024 to .003 of an inch radius have been successfully made by the method and means of the present invention. The desired lens size can be controlled by the size of glass beads used. If desired, increased coverage of the roll can be secured by repeating the operation. While the repeat embossing results in some overlapping of the lens forming depressions, such overlapping does not materially impair the function of the lenses formed thereby and gives an overall increase in the reflecting capacity of the strip embossed by the roll.

The roll to be embossed is preferably made of a relatively soft stainless steel. As above stated, the roller 31 is harder than the roll being embossed. The hardness of the roll and roller is relative. Preferably the material of the roller is not so hard as to preclude some slight impression being made in it by the beads. A relative hardness such that the beads make slight impressions in the roller 31 provides better control of the beads, more uniform impressions in the soft roll being embossed and there is less tendency to crush the larger beads.

What is claimed is:

1. The method of embossing a metal roll for producing a continuous flexible strip of optically homogeneous material having lenticular protuberances from one surface thereof, which comprises mounting the roll for rotation thereof, holding a roller in spaced relation to the roll and for rotation of the roller, supplying loose substantially spherical beads of glass-like material between the roll and the roller in substantially a layer of one bead in thickness, the beads being of substantially the same size and having an optically smooth surface, the roller being spaced from the roll a distance less than the diameter of the smallest bead, and rotating the roll and the roller for passing the beads therebetween and for pressing the beads partially into the roll to form cavities therein of spherical shape and with optically smooth surface.

2. The method of embossing a metal roll for producing a continuous flexible strip of optically homogeneous material having lenticular protuberances from one surface thereof, which comprises mounting the roll for rotation thereof, holding a roller in spaced relation to the roll and for rotation of the roller by the roll, supplying loose substantially spherical beads of glass-like material between the roll and the roller in substantially a layer of one bead in thickness, the beads being up to .006 inch in diameter and having an optically smooth surface, the roller being spaced from the roll a distance less than the diameter of the smallest bead, and rotating the roll and the roller for passing the beads therebetween and for pressing the beads partially into the roll and thereby individually forming cavities therein of spherical segmental shape with optically smooth surface.

3. The method of embossing a metal roll for producing a continuous flexible strip of optically homogeneous material having lenticular protuberances from one surface thereof, which comprises mounting the roll for rotation thereof, holding a roller in spaced relation to the roll for rotation of the roller, supplying loose substantially spherical beads of glass-like material between the roll and the roller in substantially a layer of one bead in thickness, the beads being .0048–.006 inch in diameter and having an optically smooth surface, the roller being spaced from the roll a distance less than the diameter of the smallest bead, and rotating the roll and the roller for passing the beads therebetween and for pressing the beads partially into the roll to form one cavity per bead and with optically smooth surface.

4. The method of embossing a metal roll for producing a continuous flexible strip of optically homogeneous material having lenticular protuberances from one surface thereof, which comprises mounting the roll for rotation thereof, holding the roller in spaced relation to the roll and for rotation of the roller, supplying loose substantially spherical beads of glass-like material between the roll and the roller in substantially a layer of one bead in thickness, the beads being up to .006 inch in diameter and having an optically smooth surface, and rotating the roll and the roller for passing the beads therebetween and for pressing the beads partially into the roll to form individual cavities therein of the shape of a portion of the beads and with optically smooth surface, the roller being spaced from the roll by up to .005 inch for determining the depth of the cavities dependent on the size of bead forming the respective cavities.

5. The method of embossing a metal roll for producing a continuous flexible strip of optically homogeneous material having lenticular protuberances from one surface thereof, which comprises mounting the roll for rotation thereof, holding a roller in spaced relation to the roll and for rotation of the roller by the roll, placing glass beads in the nip between the roll and the roller in substantially a layer of one bead in thickness, the beads being spherical and of substantially the same size and having an optically smooth surface, the roller being spaced from the roll a distance less than the diameter of the smallest bead, and rotating the roll and the roller for passing the beads therebetween and for pressing the beads partially into the roll to form cavities therein of spherical segmental shape and of less depth than the diameter of the smallest bead and with optically smooth surface.

6. The method of embossing a metal roll for producing a continuous flexible strip of optically homogeneous material having lenticular protuberances from one surface thereof, which comprises mounting the roll for rotation thereof, holding a roller in spaced relation to the roll for rotation of the roller by the roll, supplying substantially spherical glass beads between the roll and the roller in substantially a layer of one bead in thickness, and without restraint on relative positioning of the beads in forming such layer, the beads being .0048–.006 inch in diameter and having an optically smooth surface, the roller being spaced from the roll up to .005 inch, and rotating the roll and the roller for passing the beads therebetween and for pressing the beads partially into the roll to form one cavity per bead, and the cavities being segments of a sphere in shape with optically smooth surface.

References Cited in the file of this patent

UNITED STATES PATENTS

| | | |
|---|---|---|
| 1,116,776 | Wilcox | Nov. 10, 1914 |
| 1,760,675 | Wadsten | May 27, 1930 |
| 1,784,866 | Fahrenwald | Dec. 16, 1930 |
| 1,833,025 | Langenberg | Nov. 24, 1931 |
| 1,943,995 | Weld | Jan. 16, 1934 |
| 2,024,007 | McColloch et al. | Dec. 10, 1935 |
| 2,114,072 | Cleveland | Apr. 12, 1938 |
| 2,146,683 | McColloch | Feb. 7, 1939 |
| 2,337,016 | Hillix et al. | Dec. 14, 1943 |
| 2,337,018 | Hillix et al. | Dec. 14, 1943 |
| 2,440,963 | Luce | May 4, 1948 |
| 2,562,078 | Winnek | July 24, 1951 |
| 2,567,275 | Colombo | Sept. 11, 1951 |